United States Patent [19]

Lang

[11] 4,170,292
[45] Oct. 9, 1979

[54] CARGO SHUTTLE

[75] Inventor: John M. Lang, Bellevue, Wash.

[73] Assignee: The Boeing Company, Seattle, Wash.

[21] Appl. No.: 755,835

[22] Filed: Dec. 30, 1976

[51] Int. Cl.² ............................................. B65G 25/10
[52] U.S. Cl. .................................. 198/746; 104/162;
198/749; 198/838
[58] Field of Search ............... 198/740, 746, 747, 748,
198/749, 732, 729, 838, 738; 104/94, 95, 162,
172 B, 176; 244/137 R

[56] References Cited

U.S. PATENT DOCUMENTS

| | | | |
|---|---|---|---|
| 550,878 | 12/1895 | Gilman | 104/119 |
| 1,869,046 | 7/1932 | Buck | 214/16.1 DB |
| 2,339,288 | 1/1944 | Norbom | 244/137 |
| 2,362,208 | 11/1944 | Langen | 198/744 |
| 2,839,009 | 6/1958 | Francis | 104/170 X |
| 2,987,011 | 6/1961 | Melmer | 104/172 B |
| 3,186,355 | 6/1965 | Stoll et al. | 104/172 B |
| 3,194,178 | 6/1965 | Weston | 104/119 |
| 3,302,772 | 2/1967 | Alsop | 198/746 |
| 3,508,499 | 4/1970 | Collins | 104/176 |
| 3,525,306 | 8/1970 | Edel | 104/119 X |
| 3,530,802 | 9/1970 | Edens | 104/176 |
| 3,698,539 | 10/1972 | Schwarzbeck | 198/782 |
| 3,712,460 | 1/1973 | Kitajima | 198/746 |
| 3,799,327 | 3/1974 | Schulz | 104/172 B |

FOREIGN PATENT DOCUMENTS

| | | | |
|---|---|---|---|
| 1122091 | 1/1962 | Fed. Rep. of Germany | 104/162 |
| 2461757 | 8/1976 | Fed. Rep. of Germany | 198/838 |
| 537007 | 12/1976 | U.S.S.R. | 198/746 |

Primary Examiner—John J. Love
Assistant Examiner—Douglas D. Watts
Attorney, Agent, or Firm—Christensen, O'Connor, Johnson & Kindness

[57] ABSTRACT

A shuttle conveyor for moving articles fore and aft on a cargo support, such as the baggage area in an aircraft cargo compartment, comprises a trolley assembly moved fore and aft by a cable means travelling in downwardly canted tracks and a means to raise and lower selectively one of two cargo-engaging pawls adapted to move cargo forward or aft of the compartment and operated by cable or chain operators.

7 Claims, 11 Drawing Figures

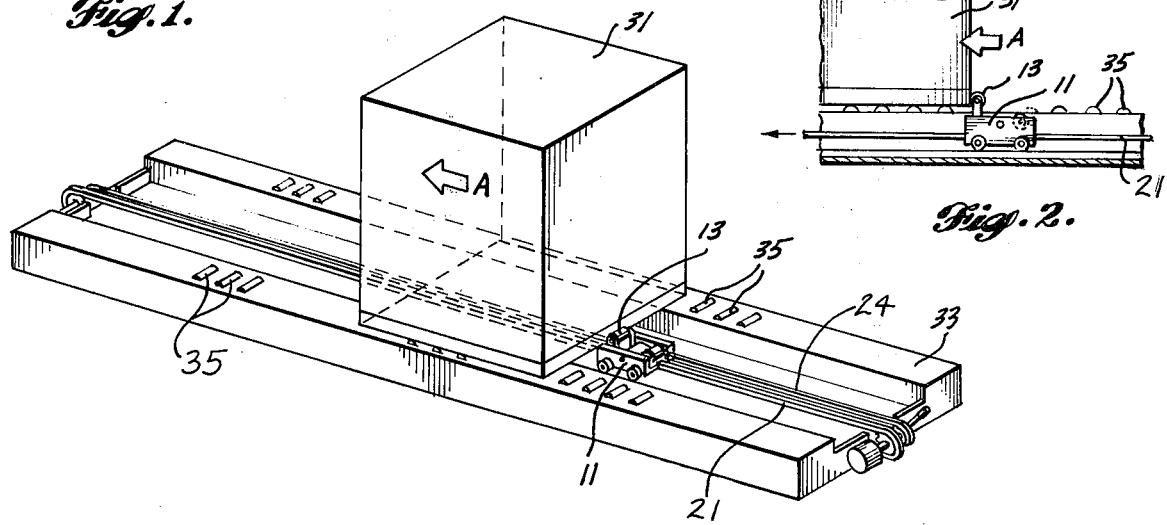
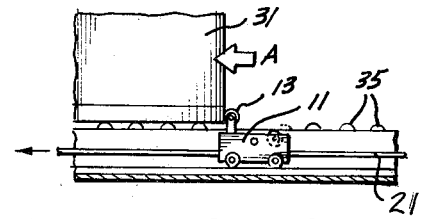
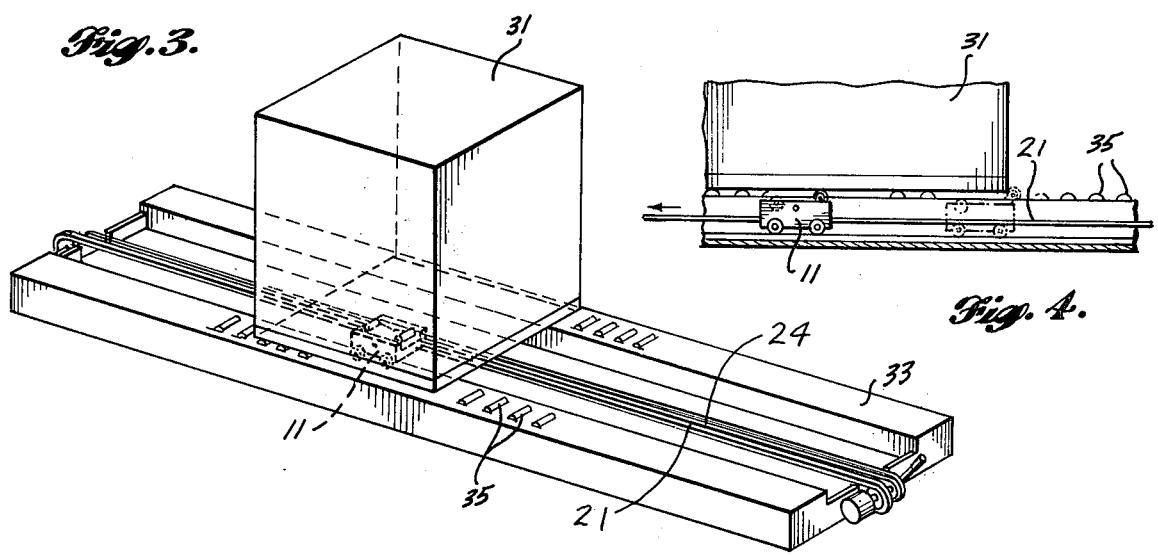
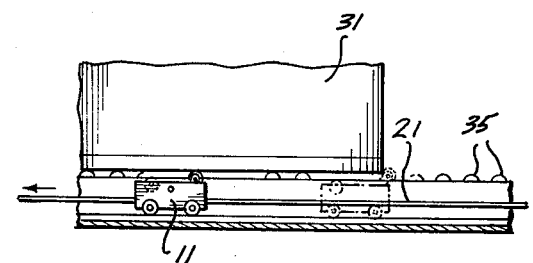
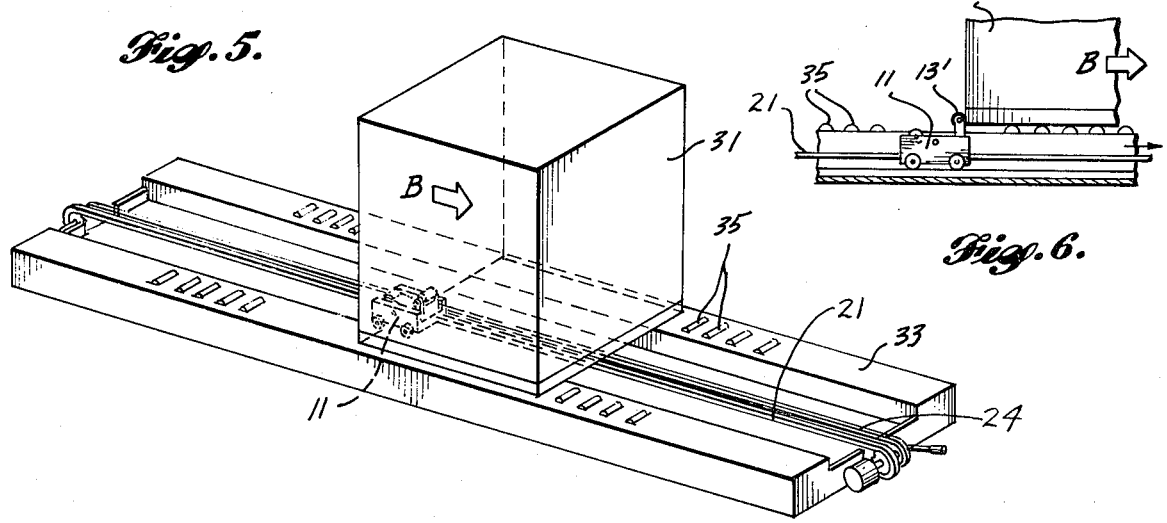

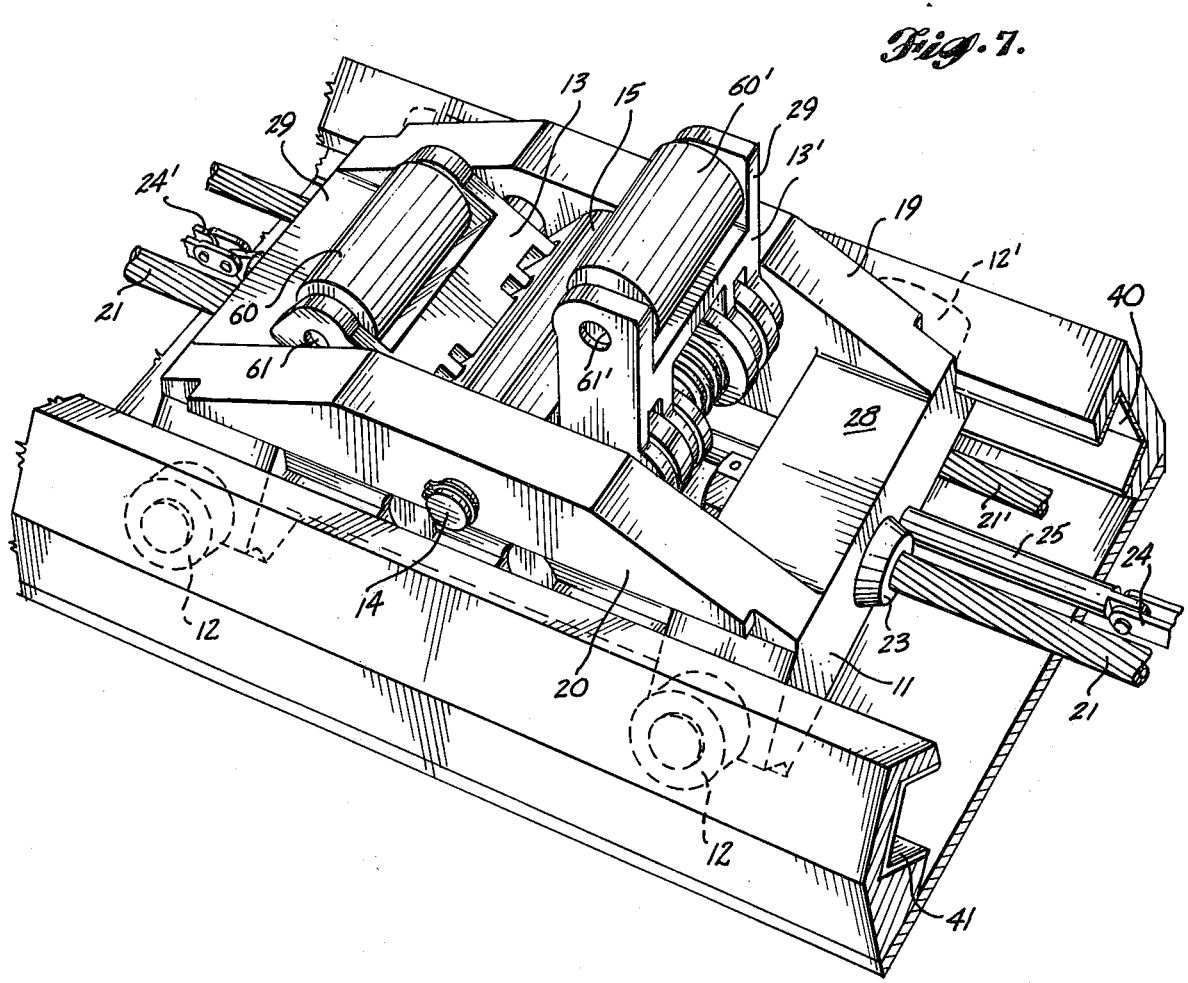
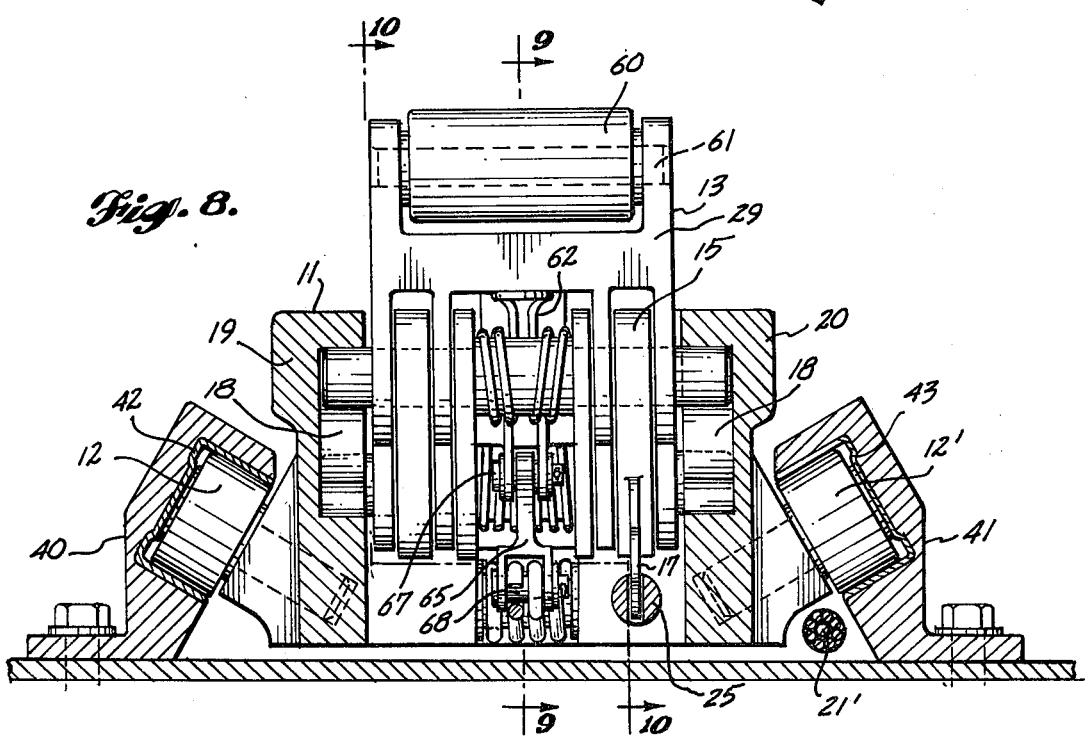

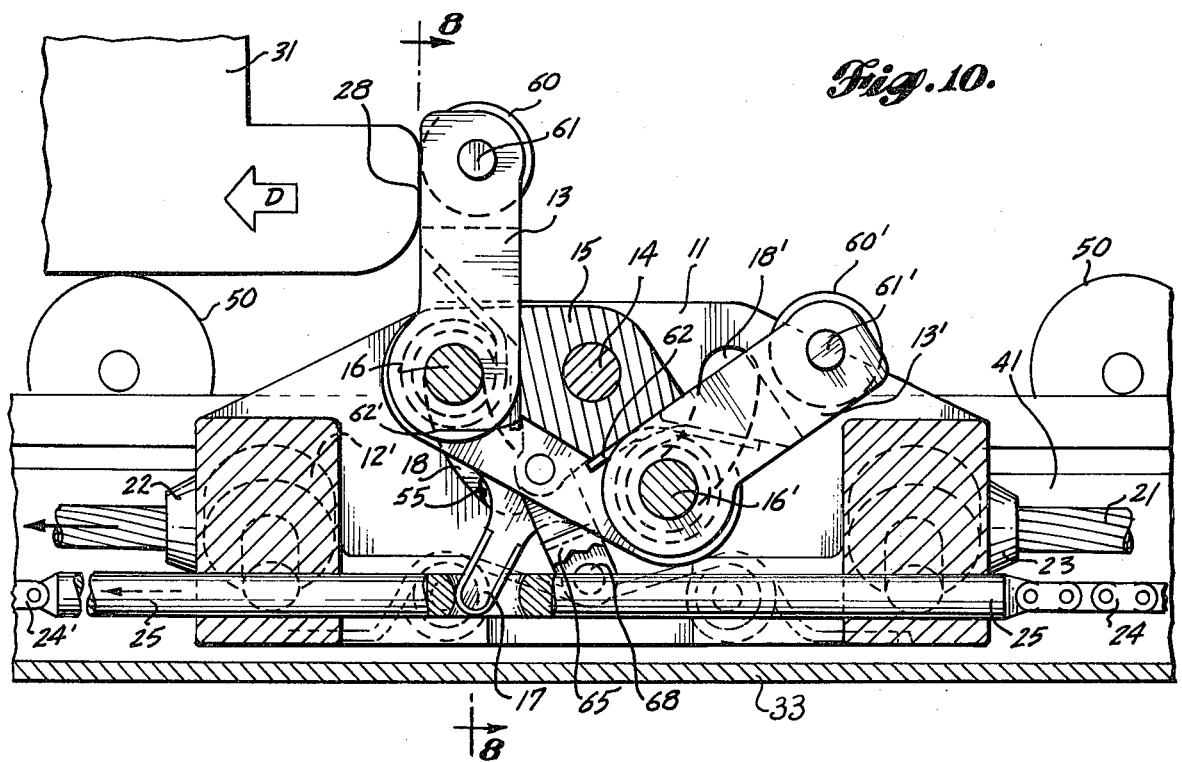
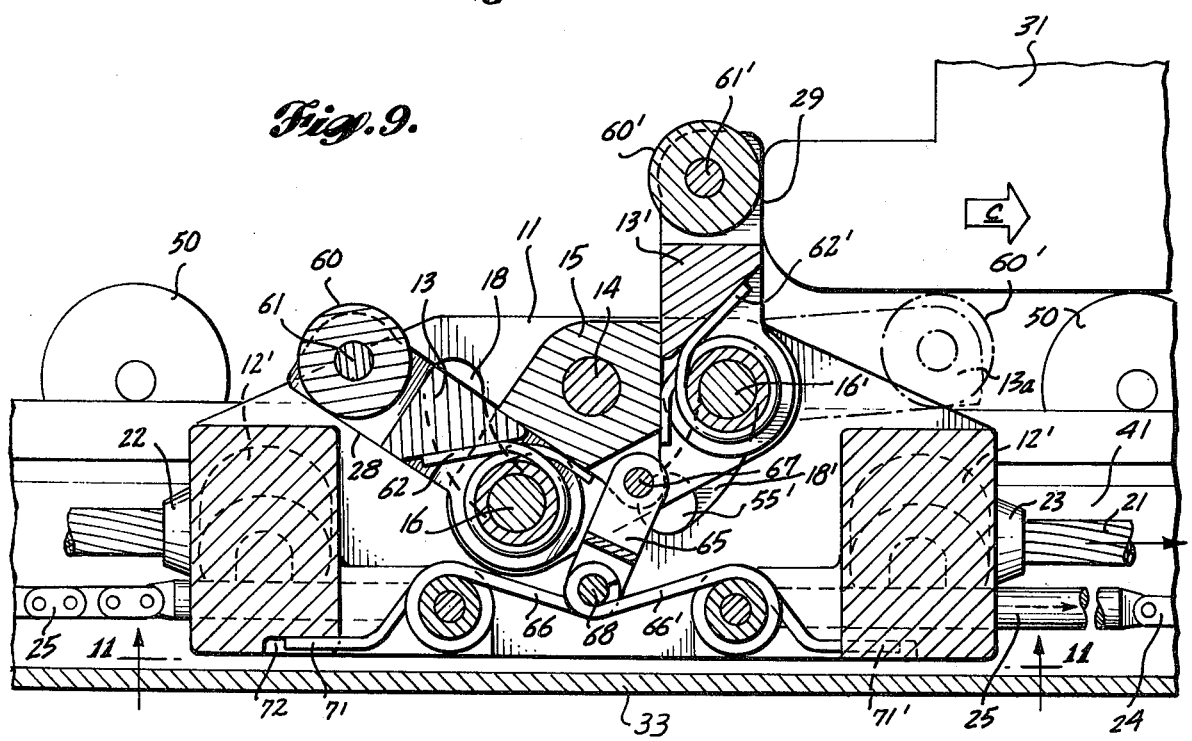
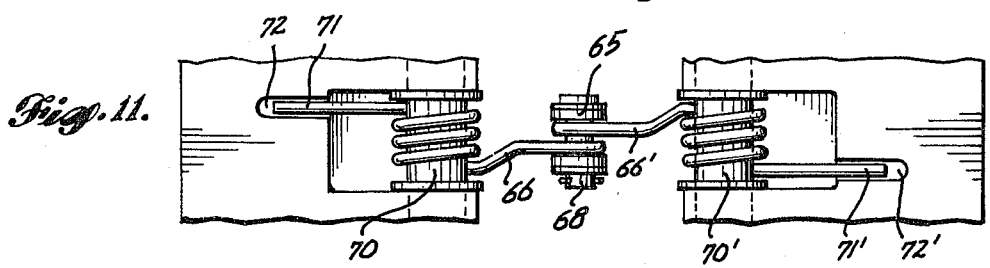

CARGO SHUTTLE

BACKGROUND OF THE INVENTION

1. Field of the Invention

This invention relates to apparatus for the handling of cargo pallets or containers in a cargo compartment, such as in an aircraft, ship or train, or in storage facilities for cargo containers and pallets. This invention further relates to apparatus for moving cargo into and out of a cargo space, which apparatus is installed in the floor of the cargo space.

2. Prior Art

It is well known to use cargo moving shuttle conveyors for moving articles fore and aft on a track in the floor in cargo compartments such as aircraft and the like. U.S. Pat. No. 3,568,825 issued to Munger shows such a device in which a rotatable bar may be erected into a cargo-engaging position by a tripping pin mechanism located in the track. In order to utilize this apparatus, it is necessary to have the shuttle conveyor move to the location of the tripping mechanism in order to raise or lower the cargo-engaging bar. While this system works suitably in many applications, it is frequently necessary to raise or lower the cargo-engaging bar at a location other than the location of the tripping mechanism. In addition, the location and orientation of the tracks used in the Munger device permit ingestion of dirt and other abrasive material which occasionally clogs and causes wear to the tracks.

OBJECTS OF THE INVENTION

A principal object of this invention is to provide a powered shuttle for moving cargo into and out of a cargo space.

Another object of this invention is to provide a shuttle having a pair of cargo-engaging pawls which may be erected for engagement with cargo in response to movement of a control means at any position along the track in which the shuttle runs.

Another object of this invention is to provide downwardly canted trolley track for a cargo-transporting shuttle to prevent ingestion of foreign matter into the tracks.

An additional object of this invention is to provide a cargo transporting shuttle for an aircraft cargo deck which occupies a minimum of vertical space.

A further object of this invention is to provide a shuttle in an aircraft cargo deck which occupies a minimum amount of space between the floor of the cargo compartment and the rollers provided for movement of the cargo into and out of the cargo compartment.

A still further object of this invention is to provide a cargo supporting surface having a shuttle remotely operable to engage cargo at any longitudinal location and operable within a pair of opposed, downwardly canted tracks, said shuttle including means to engage cargo for transport in either direction mounted on a rotatable rocker assembly biased into either of two operable positions by a spring biased toggle linkage.

SUMMARY OF THE INVENTION

The disclosed cargo-moving shuttle conveyor system for moving and storing cargo into and out of an elongated cargo storage compartment, such as an aircraft cargo compartment, comprises a floor mounted shuttle carriage positioned within downwardly canted track means and containing a pair of erectable cargo-engaging pawl means which in a first position engage and move cargo longitudinally along the track and in the second position are withdrawn from engagement with the cargo. The pawls are spring biased in the cargo-engaging position, permitting the pawl to rotate downwardly for translation of the shuttle beneath the cargo in the direction opposed to the cargo-engaging direction of travel for each pawl. Erection of the pawls is controlled by an elongate control mechanism, such as cable or chain, positioned between the tracks, and the carriage is drawn along the tracks by an endless drive cable. The cargo-engaging pawls are thus controllable to permit the carriage to pass underneath the cargo and may be erected at any location along the track.

The shuttle carriage includes a rotatable rocker yoke which carries the cargo-engaging pawls. The rocker yoke is rotatable from a first position in which one of the pawls is erected and positioned in its cargo-engaging location and a second position in which the second cargo pawl is positioned in its location for engagement with cargo. The pawls are rotatably mounted on the rocker yoke so that they may be rotated downwardly, while upwardly biased by a spring, so that the apparatus may pass underneath the cargo. A roller is provided to permit the pawl to traverse the bottom of the cargo without damage thereto. The pawls are rotatably mounted on the rocker yoke by pawl pivot pins, the ends of which protrude from the rocker and travel in arcuate slots, thereby limiting the extent of rotation permitted to the rocker yoke.

BRIEF DESCRIPTION OF THE DRAWINGS

FIG. 1 is a diagrammatic, perspective view of the cargo-moving shuttle of this invention shown moving a container longitudinally along the tracks.

FIG. 2 is a side elevational view of the apparatus shown in FIG. 1.

FIG. 3 is a perspective view of the apparatus shown in FIG. 1 with the shuttle means shown traversing beneath the cargo.

FIG. 4 is a side elevational view of the apparatus shown in FIG. 3.

FIG. 5 is a perspective view of the apparatus of this invention shown moving a cargo container in a direction opposite to that shown in FIG. 1.

FIG. 6 is a side elevational view of the apparatus shown in FIG. 5.

FIG. 7 is a perspective view of the cargo-moving shuttle positioned within downwardly canted tracks with one cargo-engaging pawl erected.

FIG. 8 is a cross-sectional view of the apparatus shown in FIG. 7, taken along lines 8—8 of FIG. 10.

FIG. 9 is a cross-sectional view of the apparatus shown in FIG. 7, taken along lines 9—9 of FIG. 8.

FIG. 10 is a cross-sectional view of the apparatus shown in FIG. 7, taken along lines 10—10 of FIG. 8.

FIG. 11 is a fragmentary bottom plan view of the toggle spring linkage mechanism.

Referring specifically to the drawings in FIGS. 1–6, diagrammatic representations of the device of this invention are shown in various views. The apparatus is shown schematically for transport of cargo along a cargo supporting surface 33. Shuttle 11 is shown in FIG. 1 moving a container 31 in the direction of arrow A, along surface 33 which is equipped with cargo rollers 35. Container 31 may be any one of the well known containers, pallets or other cargo handling devices well known in the art. In this schematic representation, pawl 13 is erected and engages the side of container 31 near the bottom thereof. Driving forces are then applied to draw cable 21 to move container 31. FIG. 2 shows the apparatus in FIG. 1 in side elevation.

In FIGS. 3 and 4, shuttle 11 is shown traversing beneath cargo 31 with pawl 13 withdrawn responsive to relative longitudinal movement of control chain 24, so that it may reach the other side of the container 31, as is shown in FIGS. 5 and 6. The travel of the container 31 may then be reversed and the container 31 removed from the cargo area by engagement of pawl 13' with the side of container 31.

In FIG. 7, a perspective view of one embodiment of this invention is shown. A shuttle carriage 11 is shown operatively positioned within downwardly canted tracks 40 and 41. The tracks 40 and 41, as is best seen in FIGS. 7 and 8, have replaceable liners 42 and 43 therein which may be conveniently exchanged for new liners in the event of excessive wear through extended usage. Shuttle 11 has carriage sides 19 and 20 and cross-pieces 28 and 29, all of which are preferably cast as a single unit and form the framework in which the remaining components of the shuttle assembly are mounted. Wheels 12 and 12' run in tracks 40 and 41 respectively, and are mounted on carriage 11 as shown. The provision of the tracks canted downwardly prevents intrusion of dirt and other foreign matter into the tracks 40 and 41, thus prolonging the life and minimizing the maintainance of the apparatus.

A rotatably mounted rocker-yoke 15, best seen in FIGS. 7, 9 and 10, is positioned between carriage sides 19 and 20 and is rotatably mounted on rocker pivot pin 14. Pawls 13 and 13' are mounted on the outer ends of rocker yoke 15 and are pivotally urged about pawl pivot pins 16 and 16' by pawl spring 62 and 62' respectively. Pivotal movement about pawl pivot pins 16 and 16' is provided so that the pawl 13 may rotate downwardly into the position shown in FIG. 9 at 13a so that it may pass underneath cargo 31 in the direction opposite of arrow C.

Rocker yoke 15, being pivotally mounted about rocker yoke pin 14, may be moved, as is best seen in FIGS. 9 and 10, into either of two operating positions. Thrust on control crank 17 imposed by movement of control slider rod 25 causes movement of rocker yoke 15 from the position shown in FIG. 10 to the position shown in FIG. 9. An overcenter-type latch arrangement is utilized to control the position of rocker yoke 15 and comprises a toggle link 65 pivotally mounted at its upper end to rocker yoke 15 at upper toggle pin 67 and pivotally mounted at its lower end to a pair of toggle spring means 66 and 66' at lower toggle pin 68. Upwardly directed thrust on pin 68 causes toggle link 65 to urge rocker yoke 15 into one of two positions shown either in FIG. 9 or FIG. 10. Rotation of rocker yoke 15 about pin 14 causes a downward motion of toggle link 65 against the upward bias of springs 66 and 66'.

Pawl pivot pins 16 and 16' travel in arcuate slots 18 and 18' which restrict the movement thereof. For assembly purposes, pawl 13 and 13' are mounted on rocker yoke 15 by insertion of pawl pivot pins 16 and 16' through assembly holes 55 and 55', respectively.

Control of the location of pawl 15 is obtained by relative movement of control slider rod 25 with respect to carriage 11. An operator control chain 24 is shown which may be moved with respect to draw cable 21 to effect the change in orientation of yoke 15 at any location along the tracks 40 and 41.

In FIG. 11 the fragmentary bottom view of the toggle arrangement shows the mounting means for springs 66 and 66'. The toggle springs 66 and 66' are mounted upon supports 70 and 70', respectively, with the tang of the springs inserted into coves 72 and 72'. Tension is placed upon springs 66 and 66' such that upwardly directed forces are imposed upon pin 68. Spring induced rotational forces about toggle spring supports 70 and 70' tend to hold tangs 71 and 71' in coves 72 and 72', respectively.

In operation, the apparatus shown in FIGS. 7–11 is manipulated so that the pawl next adjacent the container, pallet or other cargo resting upon roller 50 is erected. In FIG. 10, pawl 13 is the pawl which is erected by movement of control slider rod 25 to the left in the drawing, so that control crank 17 rotates rocker yoke 15 in a clockwise direction about rocker pin 14, limited in travel by the extent of rotation permitted by pawl pivot pin 16 within arcuate slot 18. Pawl spring 62 urges pawl 13 into its upward position so that contact is made with the cargo by pawl surface 28. Roller 60 does not contact the cargo since it is set back from pawl surface 28, but it does protrude from the opposite side of pawl surface 28.

Movement of the carriage along tracks 40 and 41 with pawl 13 or 13' in engagement with the cargo 31 causes the cargo 31 to move along on rollers 50 to the desired location within the aircraft or cargo storage area. When the proper location for the cargo is obtained, the pawl engaging the cargo is withdrawn and carriage 11 is transported along rails 40 and 41 beneath the cargo 31 as best seen in outline in FIG. 9. Any container or other cargo device which is resting on rollers 50 will be abutted upon by roller 60' on pawl 13' and further movement of the carriage will cause pawl 13 to rotate downwardly into the position shown at 13a in FIG. 9. Roller 60' will roll along underneath cargo container 31, all the while being biased upwardly by pawl spring 62'. The other pawl 13 remains in its nested position as shown in FIG. 9, out of contact with the cargo containers. Carriage 11 is drawn along to its next operative location by cable 21 which is drawn in synchronization with control chain 24. Movement of carriage 11 to a position at which roller 60' no longer engages the container 31 permits pawl 13 to rotate upwardly as biased by spring 62' into the position shown in FIG. 9, ready for engagement with another container 31 to be moved in the direction of arrow C.

In the event cargo is to be transported in the direction of arrow D in FIG. 10, control rod 25 is translated in the direction of arrow D, so that rocker yoke 15 is rotated about pin 14 into the position shown in FIG. 10. Pawl 13 is then erect and positioned for engagement with container 31.

Accordingly, a shuttle has been disclosed having a control mechanism which permits remotely controlled operation of the mechanism at any position along the length of the tracks, so that cargo positioned at any location along the tracks may be moved in either direction merely by properly locating the shuttle and manipulating the control mechanism to insure that the pawl adapted to move the cargo in the desired direction is erected for engagement with the cargo. Also disclosed is a unique downwardly canted track means for cargo shuttles which aids in avoiding ingestion of dirt and abrasives into the shuttle system, thereby prolonging its useful life and decreasing maintenance.

While only one embodiment of this invention has been shown in detail in the accompanying specification and drawings, it will be apparent that various modifications in structure and operation of the device may be made by one of skill in the art without departing from the broad principles of the invention as indicated by the scope of the following claims.

I claim:

1. Apparatus for transporting cargo across a roller equipped, load-bearing surface, said apparatus comprising:
   track means extending along the path of travel of said cargo, said track means including a pair of substantially U-shaped tracks opening toward each other and canted downwardly;
   a shuttle carriage including a frame and having wheels mounted upon said frame positioned for movement within said tracks;
   a rocker yoke;
   first and second cargo-engaging pawls;
   first means for mounting said first pawl on said rocker yoke for swinging movement of said first pawl into and out of an erect position;
   second means for mounting said second pawl on said rocker yoke for swinging movement of said second pawl into and out of an erect position;
   third means for mounting sid rocker yoke on said frame for swinging movement of said rocker yoke between a first position in which said first pawl is extended from said frame in a cargo-engaging position and said second pawl is retracted in a nested position substantially within said frame and a second position in which said second pawl is extended from said frame in a cargo-engaging position and said first pawl is retracted in a nested position substantially within said frame;
   first biasing means for urging said first pawl toward its erect position;
   second biasing means for urging said second pawl towards its erect position;
   fourth means associated with said rocker yoke and said pawls and remotely operable to extend and retract said pawls at any location along said tracks; and
   draw cable means associated with said shuttle carriage for moving said carriage along said tracks.

2. The apparatus of claim 1 wherein said pawls further contain a roller at the upper end thereof positioned for engagement with and rolling beneath the bottom surface of said cargo during movement of said shuttle carriage beneath said cargo.

3. The apparatus of claim 1 wherein said pawls are mounted upon said rocker yoke with pivot pins having ends extending beyond the outer surfaces of said rocker yoke, said ends traversing cam-like arcuate slots in said frame, thereby limiting the extent of rotation of said rocker yoke.

4. Apparatus for transporting cargo across a roller equipped, load-bearing surface comprising:
   track means extending along the path of travel of said cargo, said track means including a pair of substantially U-shaped tracks opening toward each other and canted downwardly;
   a shuttle carriage including a frame and having wheels mounted upon said frame positioned for movement within said tracks;
   a rocker yoke;
   first and second cargo-engaging pawls;
   first means for mounting said first pawl on said rocker yoke;
   second means for mounting said second pawl on said rocker yoke;
   third means for mounting said rocker yoke on said frame for swinging movement of said rocker yoke between a first position in which said first pawl is extended from said frame in a cargo-engaging position and said second pawl is retracted in a nested position substantially within said frame and a second position in which said second pawl is extended from said frame in a cargo-engaging position and said first pawl is retracted in a nested position substantially within said frame;
   fourth means associated with said rocker yoke and pawls and remotely operable to extend and retract said pawls at any location along said tracks;
   fifth means for biasing said rocker yoke into said first position and said second position, said fifth means including an overcenter spring-actuated toggle linkage between said frame and said rocker yoke; and
   draw cable means associated with said shuttle carriage for moving said carriage along said tracks.

5. The apparatus of claim 4 wherein said rocker yoke is rotated selectively between said first and second positions by relative movement of an elongate control means disposed within said track means and remotely operable to control the position of said rocker yoke.

6. A shuttle carriage for use in transporting cargo across a roller equipped, load-bearing surface, said shuttle carriage comprising:
   a frame having a plurality of wheels rotatably mounted thereon;
   a rocker yoke;
   first and second cargo-engaging pawls;
   first means for mounting said first pawl on said rocker yoke for swinging movement of said first pawl into and out of an erect position;
   second means for mounting said second pawl on said rocker yoke for swinging movement of said second pawl into and out of an erect position;
   third means for mounting said rocker yoke on said frame for swinging movement of said rocker yoke between a first position in which said first pawl is extended from said frame in a cargo-engaging position and said second pawl is retracted in a nested position substantially within said frame and a second position in which said second pawl is extended from said frame in a cargo-engaging position and said first pawl is retracted in a nested position substantially within said frame;
   fourth means associated with said rocker yoke and pawls and remotely operable to extend and retract said pawls at any location along the path of travel of said cargo;
   first biasing means for urging said first pawl toward its erect position;
   second biasing means for urging said second pawl toward its erect position; and
   draw cable means associated with said shuttle carriage for moving said carriage over said load-bearing surface.

7. In a system for transporting cargo across a roller equipped, load-bearing surface, an improved shuttle carriage for moving said cargo, said shuttle carriage comprising:
- a frame having a plurality of wheels rotatably mounted thereon;
- a rocker yoke;
- first and second cargo-engaging pawls;
- first means for mounting said first pawl on said rocker yoke;
- second means for mounting said second pawl on said rocker yoke;
- third means for mounting said rocker yoke on said frame for swinging movement of said rocker yoke between a first position in which said first pawl is extended from said frame in a cargo-engaging position and said second pawl is retracted in a nested position substantially within said frame and a second position in which said second pawl is extended from said frame in a cargo-engaging position and said first pawl is retracted in a nested position substantially within said frame;
- fourth means associated with said rocker yoke and pawls and remotely operable to extend and retract said pawls at any location along the path of travel of said cargo; and
- biasing means for biasing said rocker yoke into said first position and said second position, said biasing means including an overcenter spring-actuated toggle linkage between said frame and said rocker yoke.

* * * * *